Nov. 24, 1931. J. L. BALTON 1,832,891
SUPPLY AND DELIVERY MECHANISM FOR CONTROL OF FLUIDS
Filed July 21, 1928 7 Sheets-Sheet 1
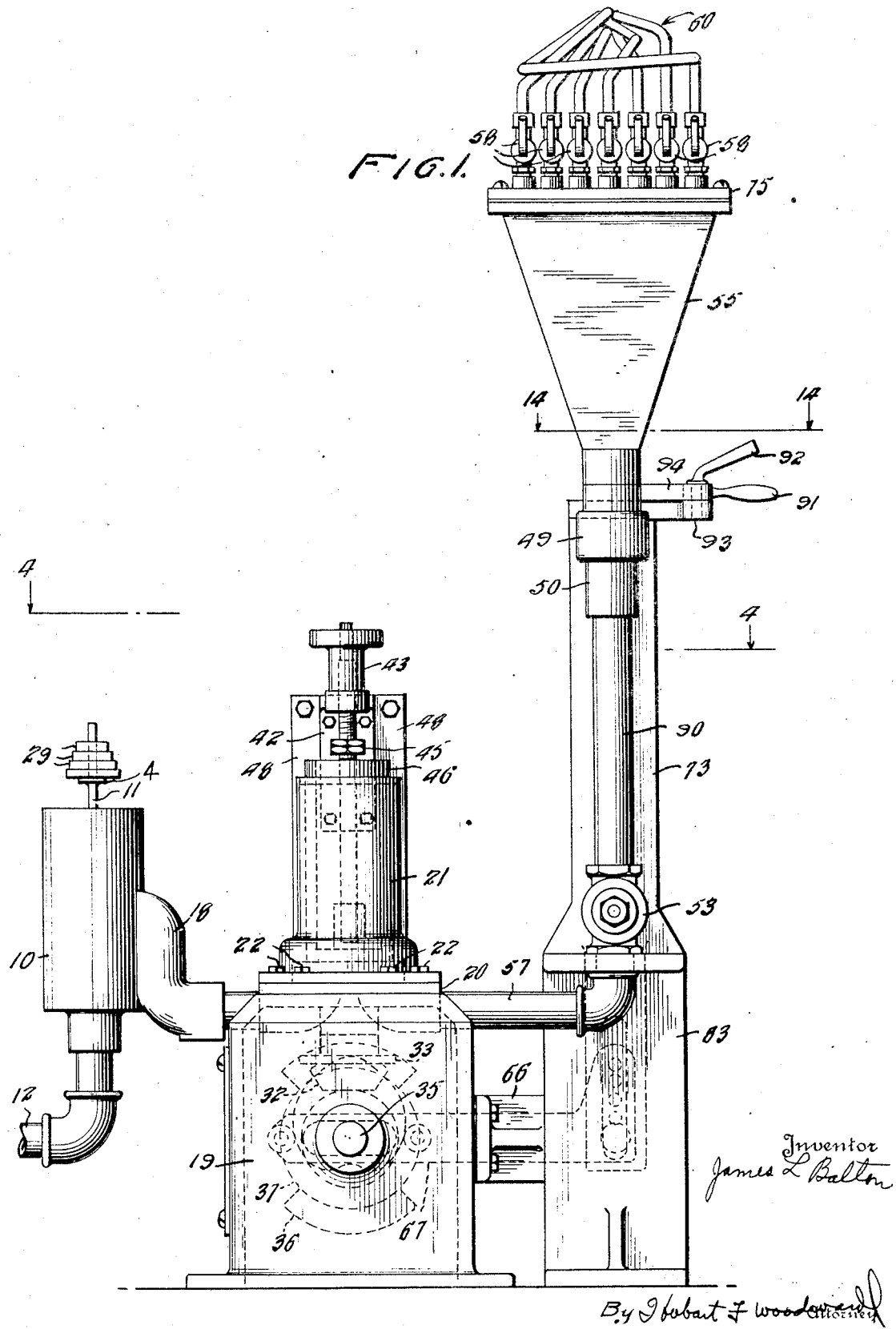

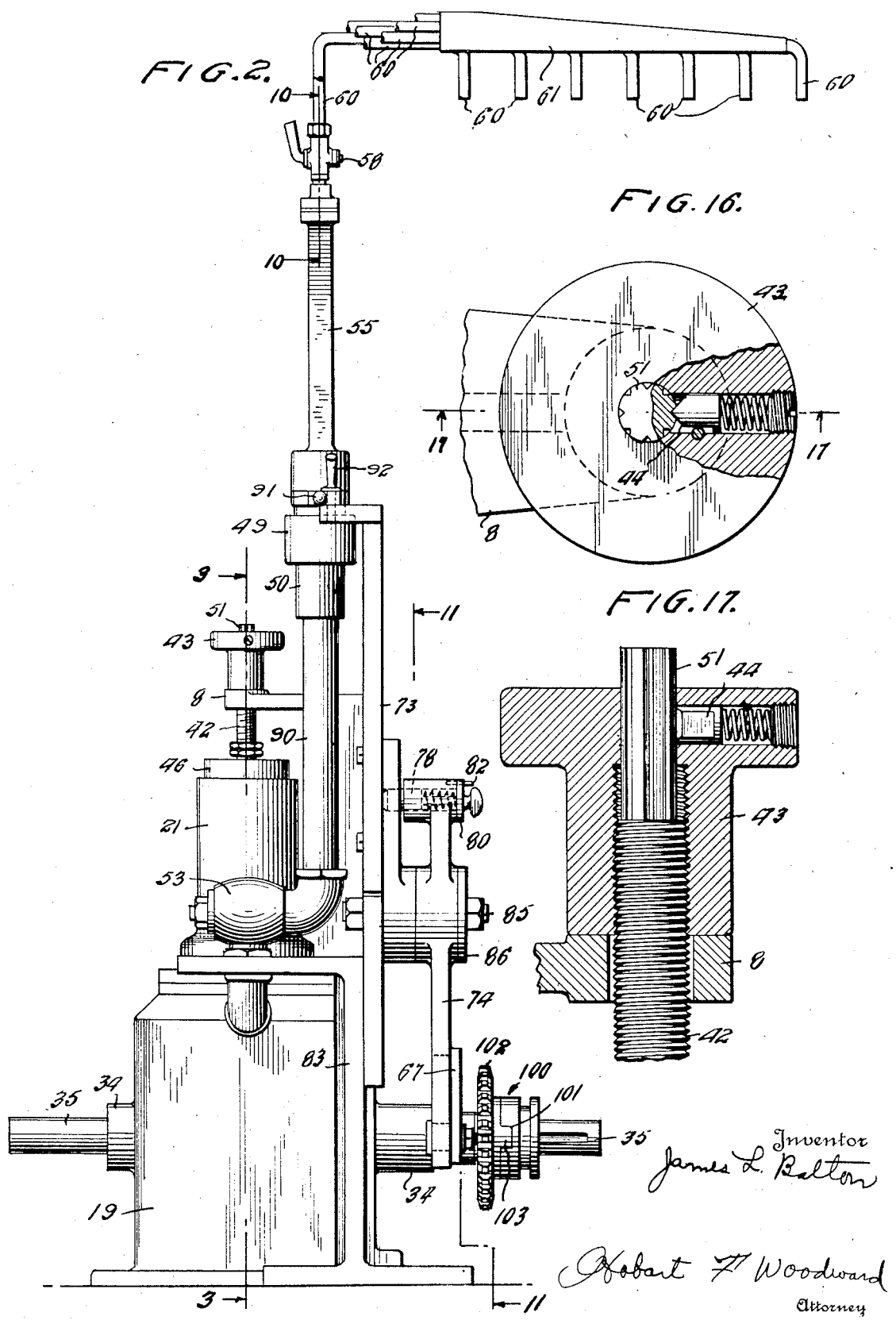

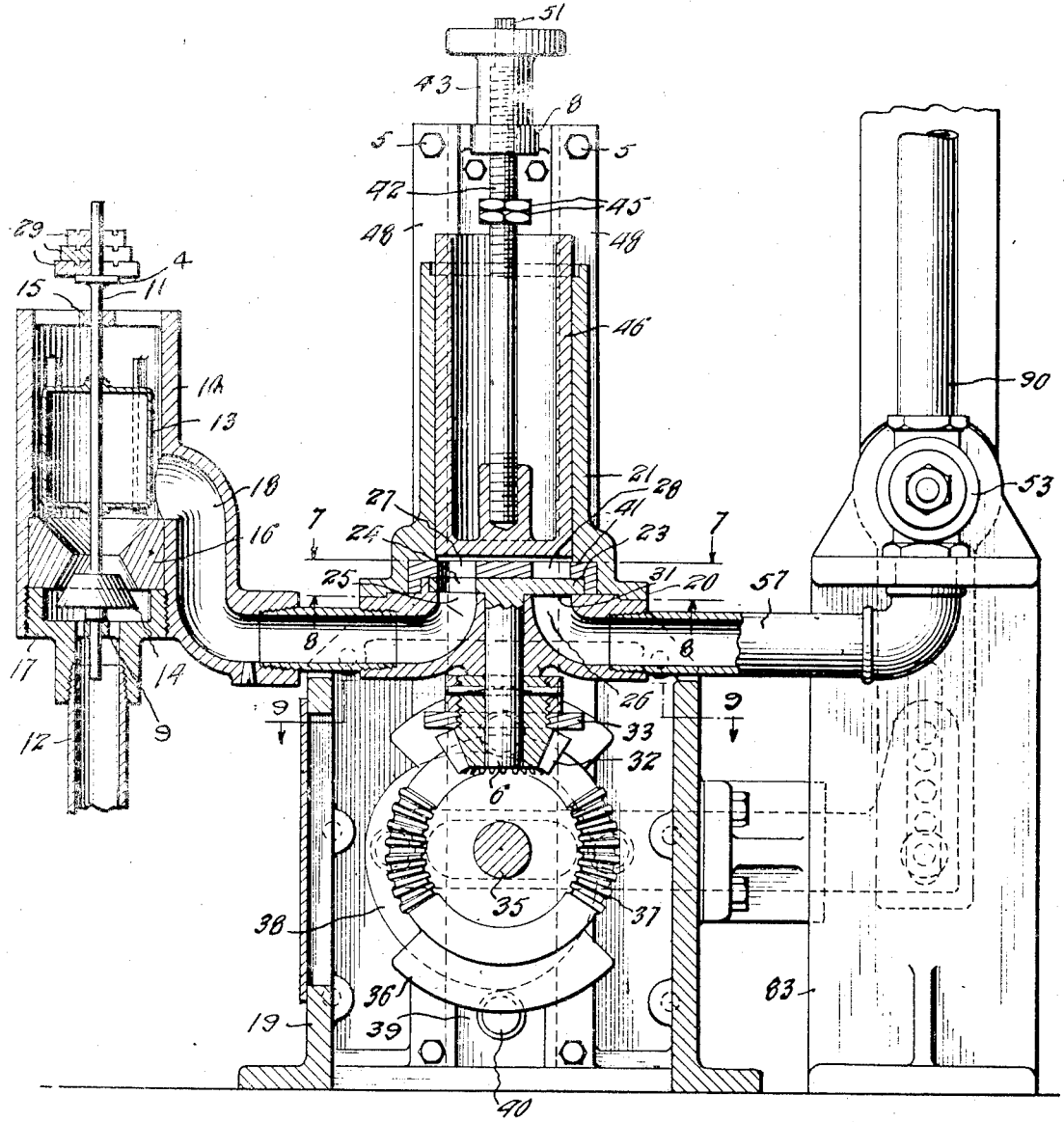

Nov. 24, 1931.    J. L. BALTON    1,832,891
SUPPLY AND DELIVERY MECHANISM FOR CONTROL OF FLUIDS
Filed July 21, 1928    7 Sheets-Sheet 4
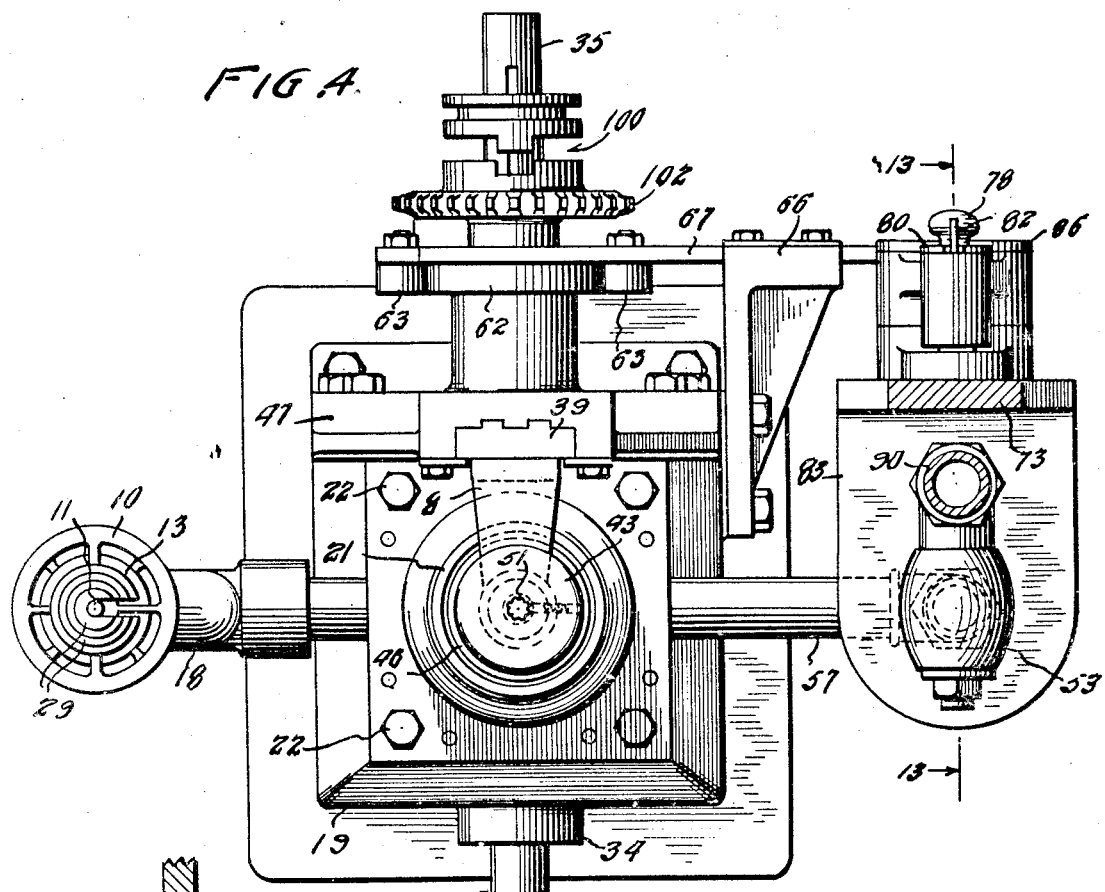
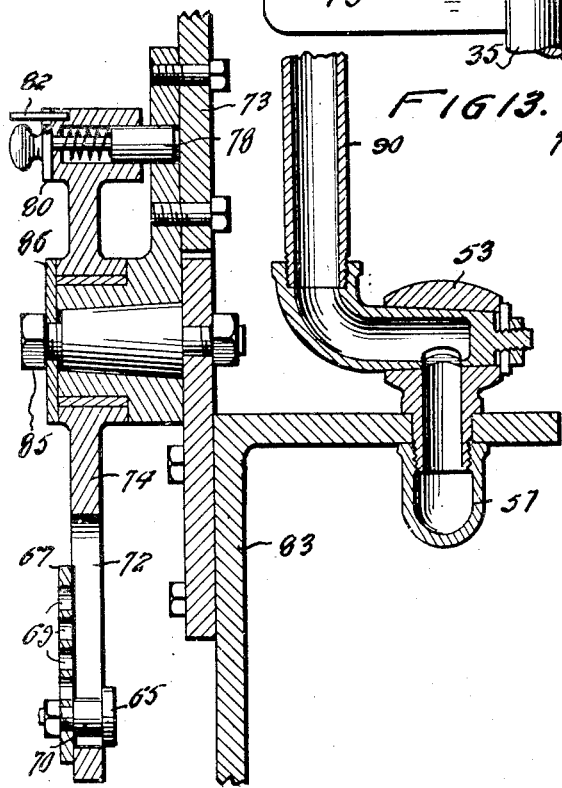
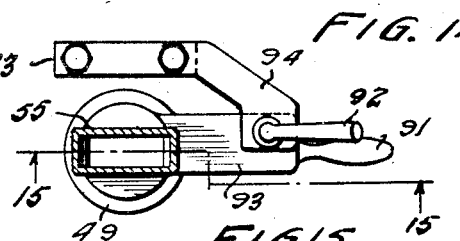
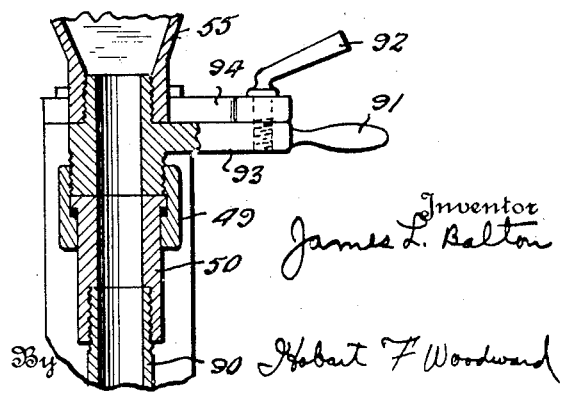

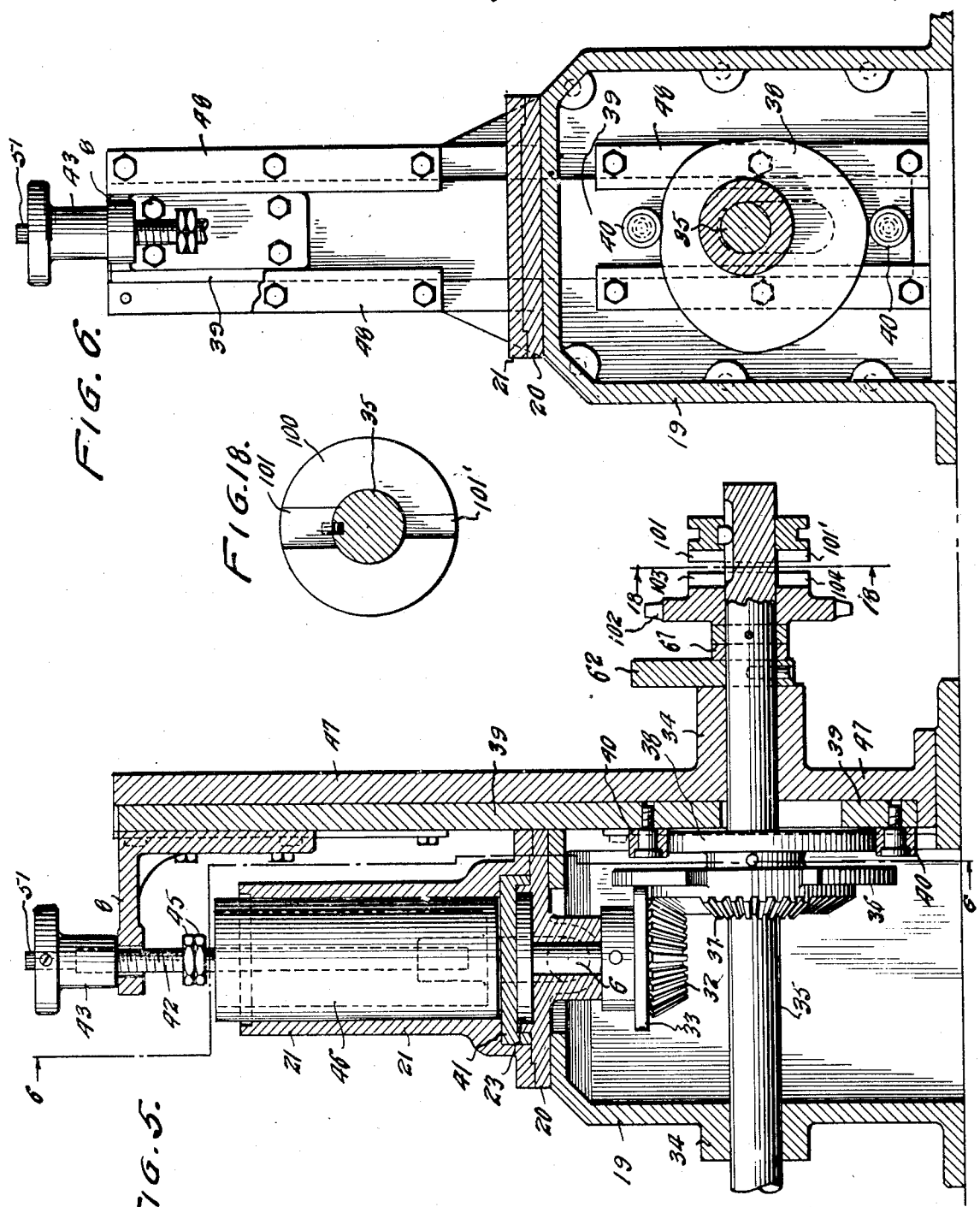

Nov. 24, 1931. J. L. BALTON 1,832,891
SUPPLY AND DELIVERY MECHANISM FOR CONTROL OF FLUIDS
Filed July 21, 1928   7 Sheets-Sheet 6

Inventor
James L. Balton
By J Hobart F Woodward
Attorney

Nov. 24, 1931.         J. L. BALTON         1,832,891
SUPPLY AND DELIVERY MECHANISM FOR CONTROL OF FLUIDS
Filed July 21, 1928         7 Sheets-Sheet 7
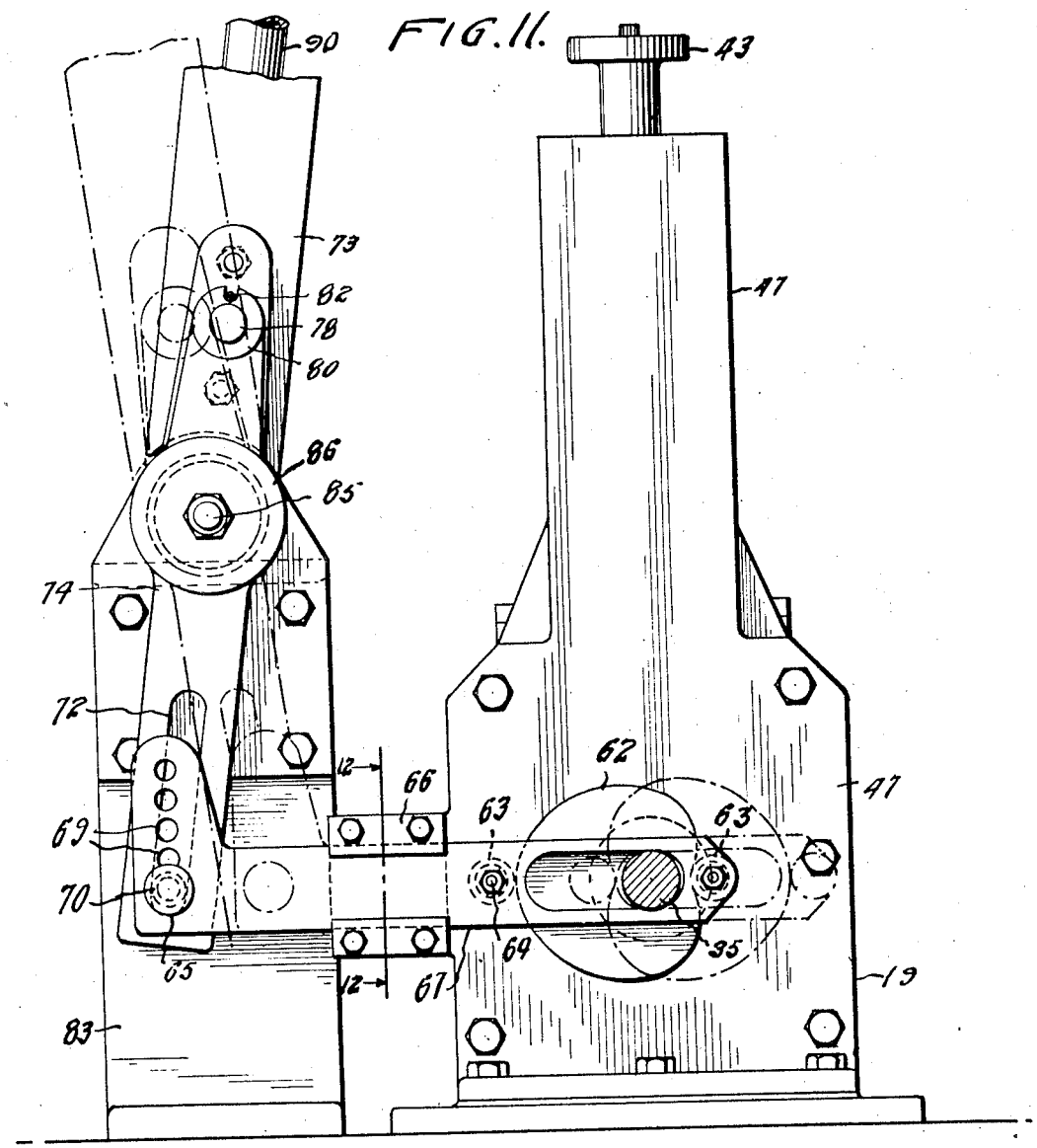
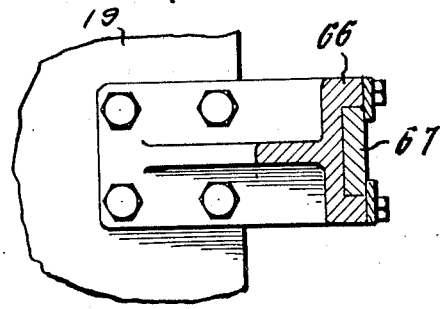

Patented Nov. 24, 1931

1,832,891

UNITED STATES PATENT OFFICE

JAMES L. BALTON, OF BALTIMORE, MARYLAND, ASSIGNOR TO JOSEPH SHAPIRO, OF BALTIMORE, MARYLAND

SUPPLY AND DELIVERY MECHANISM FOR CONTROL OF FLUIDS

Application filed July 21, 1928. Serial No. 294,450.

This invention relates to fluid or batter feeding mechanism, and more particularly to mechanism adapted to feed pastry fluid or batter to the baking devices or molds of a baking machine, such as a pastry cone machine.

In the manufacture of baked products, such as pastry cones, the machine comprises a travelling frame having a series of molds thereon with which cooperates a series of cores. The pastry or batter is supplied to the molds by means of a suitable feeding mechanism when the cores are separated from and are clear of the molds; and the cores then enter the molds and press the batter or pastry fluid to shape and pass into an oven where the molds and the batter therein are heated to bake the latter and form the baked product or article. The mold is then opened by separating the cores therefrom and the baked product is withdrawn.

In such a machine, the molds and cores should be heated and remain heated uniformly; but in view of the fact however, that the molds must pass close to and underneath the batter outlets of the feeding mechanism, this mechanism is subjected to the radiant and convective heat from the molds; and the result is, therefore, that the batter often coagulates to some extent, stopping the outlets and clogging the entire mechanism so that the operation of the machine is not only interfered with but may be interrupted altogether. This is particularly disadvantageous in a machine for making pastry cones for in such machines the batter must be measured with accuracy, especially in view of the small amount of batter really contained in a pastry cone.

The batter is usually ejected from stationary outlets and this requires rapid operation of the mechanism involved to properly charge the molds as they pass under the stationary outlets. The rapid operation of the charging mechanism greatly decreases the life of such mechanism and results in frequent repairs and shut down of the entire mechanism.

Also it has been customary in the charging mechanism to provide an individual cylinder and piston for each mold to be supplied in the set of molds passing under the charging mechanism at one time.

One of the objects of this invention, is to provide mechanism whereby the batter may be fed accurately to the baking device from oscillating outlets and whereby the feeding or charging mechanism is so constructed and arranged and has such provision as to insure the reliable operation thereof.

Another object of this invention is to provide means whereby the amount supplied to the mold may be readily regulated.

A further object of this invention is to provide a pump or other means of creating pressure whereby the batter may be forced through the nozzles or discharge openings, said pump or other device being driven at a constant rate of speed.

A further object of my invention is to provide one pump and one piston for any number of molds with means of controlling the supply of batter to each mold.

I desire to state that in characterizing the invention as above stated I have not intended to limit the particular invention hereinafter described and claimed to a machine of the specific nature disclosed, but I consider the invention applicable to machines and apparatus for producing other sort of articles, and intend the following claims to embrace all supply and delivery systems having the characteristics recited in the claims.

With the foregoing and other objects in view, the invention consists of the novel construction hereinafter more specifically stated, and illustrated in the acompanying drawings; but it is to be understood that changes, variations and modifications may be resorted to without departing from the scope of the appended claims.

In describing the invention in detail, reference is had to the accompanying drawings which form a part of this specification and wherein like characters of reference indicate corresponding parts throughout the several views, in which—

Figure 1 is front elevational view of my system;

Figure 2 side elevational view;

Figure 3 is a vertical transverse sectional view;

Figure 4 is a horizontal section on line 4—4 of Figure 1;

Figure 5 is vertical longitudinal section on line 5—5 Figure 1;

Figure 7:
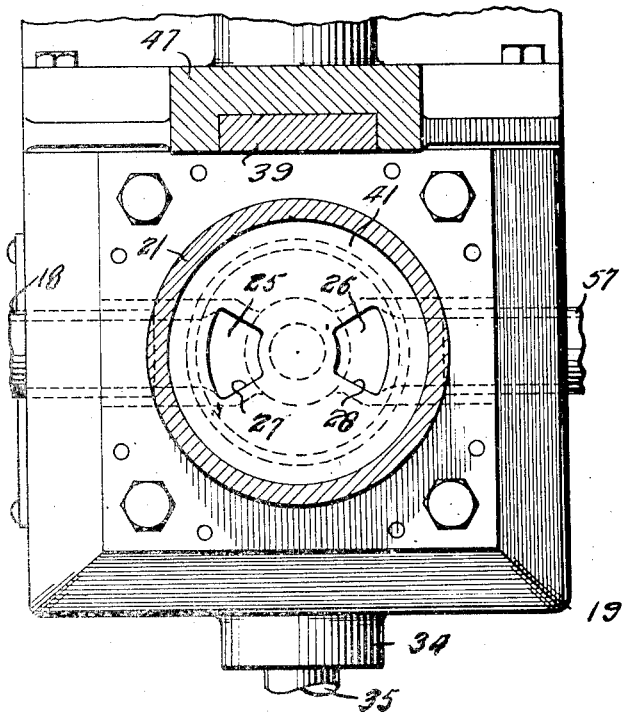
Figure 8:
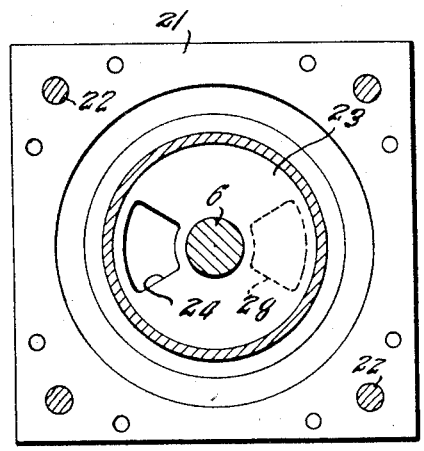
Figure 9:
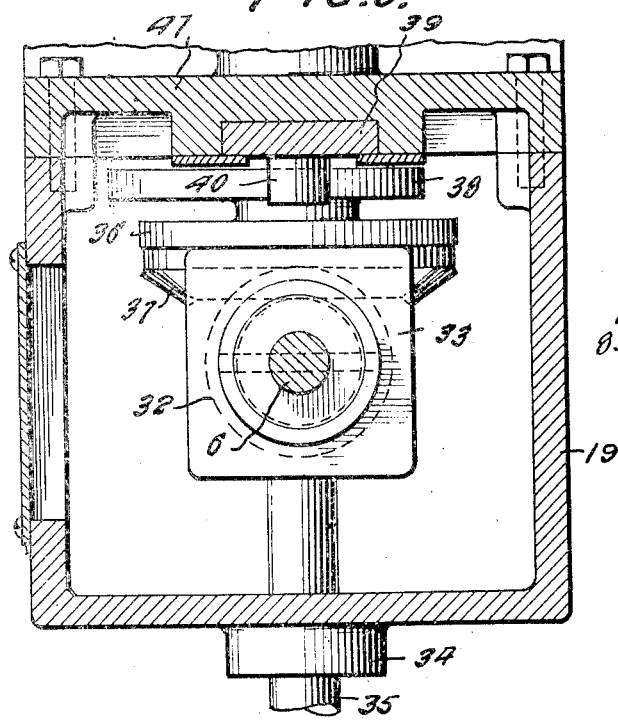
Figure 10:
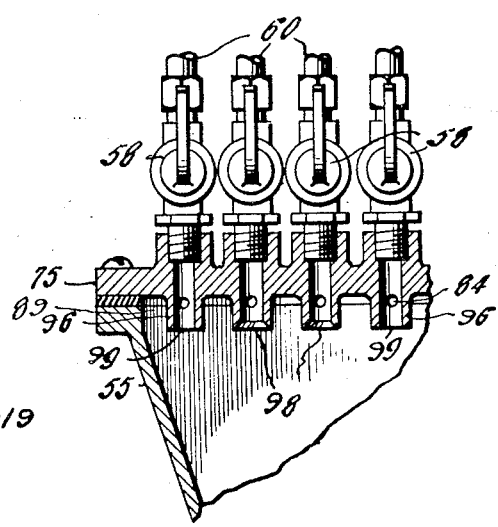

Figure 6 vertical longitudinal view on line 6—6 Figure 5;

Figure 7 horizontal sectional view on line 7—7 Figure 3;

Figure 8 horizontal view on line 8—8 Figure 3;

Figure 9 view on line 9—9 Figure 3;

Figure 10 vertical fragmentary sectional view on line 10—10 Figure 2;

Figure 11 vertical longitudinal sectional view on line 11—11 Figure 2;

Figure 12 view on line 12—12 Figure 11;

Figure 13 vertical transverse view on line 13—13 Figure 1;

Figure 14 vertical view on line 14—14 Figure 1;

Figure 15 vertical view taken on line 15—15 Figure 14;

Figure 16 plan view of knob for varying the stroke of the piston with part broken away.

Figure 17 view taken on line 17—17 Figure 16; and

Figure 18 is a view of the clutch.

Referring to the drawings it will be seen that this system is composed of several units, each of which performs a certain function in the proper and economic delivery of the material or compound to be used in the manufacture of the various articles.

The apparatus used in the preparation of the flour batter is not shown but is of the conventional design consisting of the necessary sifter, mixers, strainers, tanks and piping to deliver the material to the inlet pipe 12 leading to the housing 10. Housing 10 is adapted to receive a shaft or rod 11 on which is suitably mounted and fastened a float 13 and a valve head 14. Shaft 11 is suitably mounted in bearing or guide 15 formed integral with the housing 10 at its upper end. Housing 10 is adapted to receive, against a suitable shoulder, member 16 which forms the seat for the valve 14 when the valve is raised. The valve seat 16 is retained securely in place by a member 17 which is adapted to be screwed or in any other suitable manner retained securely in the lower portion of the housing 10. Member 17 in addition to securing the valve seat 16 in place also forms lower bearing 9 for shaft 11. Formed integral with housing 10 is supply pipe 18 which connects the first unit of the system of the second unit thereof. Shaft 11 extends above housing 10 and is provided with a shoulder 4 near its upper end to receive adjusting weights 29.

The function of the first unit just described is to maintain a uniform and constant "head" or pressure of the batter against the pump inlet valve and thereby permitting the locating of the batter mixing apparatus at any convenient location regardless of the location or position of the pump. Due to the nature and particular characteristics of batters, in that they differ greatly from true liquids, it is essential to provide means for permitting the ready escape of collected air, gas or other bubbles from the system. The air or gas bubbles give to the batter a certain compressibility which is detrimental to the efficient handling of the batter unless permitted to escape. The air or gas is permitted to escape through an opening in the top of the housing 10.

The second unit of the system is a pump member consisting of a base member or housing 19 a valve housing 20 independently secured to the cylinder 21 by screws or other suitable fastenings 22. Located in valve housing 20 is rotary valve 23 suitably ported at 24. The lower flat surface 31 of the rotary valve 23 rests upon a similar surface which forms a lower seat for the rotary valve, and which is an integral part of the valve housing 20. Surface on which 31 rests is formed with ports or openings 25 and 26 and these ports are so arranged as to connect to the inlet pipe 18 and outlet pipes 57. Rotary valve 23 is provided with a cover or top housing 41, and ports 27 and 28 are formed in member 41. Ports 27 and 28 are located directly above ports 25 and 26, respectively. Ports 25 and 26 are held in fixed relation with ports 27 and 28 by any suitable means, such as screws or bolts. Rotary valve is completely housed by members 31 and 41 and is thus protected to a great degree and insures long and satisfactory operation. Cylinder 21 is adapted to be set over the rotary valve housing and secured to base 19 by screws 22. Rotary valve 23 terminates at the lower end as a shaft 6 onto which is secured a pinion 32. A plate cam 33 is securely attached to pinion 32.

Base 19 is provided with bearings 34 into which is placed a shaft 35 which in its normal position projects beyond the walls of the base housing 19. On shaft 35 are placed cam 36 and gear 37 having a portion of its teeth removed. Cam 36 and gear 37 are securely fastened together and revolve as a unit with the shaft 35 to which they are fastened by any suitable means.

An additional cam 38 is secured to the shaft 35 within the base 19. Cam 38 operates a slide 39 through contact with the rollers or pins 40 when the shaft 35 is revolved. The motion of the slide 39 is transmitted through an arm 8 suitably secured to the slide 39 and then to the rod 42 through contact of the arm 8 with a knob 43 and the check nuts 45 thereby causing a reciprocating movement to be imparted to the rod 42. Piston 46 is secured to the rod 42 and reciprocates therewith. Slide 39 is provided with a bearing in the casing and is retained by plates 48 and secured thereto by screws 5. Casting 47 is bolted or screwed to the base 19 and forms the rear bearing 34 for shaft 35. A ratchet 51 and plunger 44 is incorporated in the knob 43 and provides a means for varying the stroke of the piston 46. When used separately or with the nuts 45 it controls the amount of batter drawn into the cylinder 21.

The batter is delivered from the pump through pipe or other suitable means 57 to a swivel joint 53 suitably mounted and connected by pipe 90 to hopper type manifold 55. Hopper manifold 55 is provided with valves 58 for regulating the amount of batter issuing from each outlet tube 60. Outlet tubes 60 are held in fixed relation to each other by head 61.

The outlets 60 travel directly above and at a substantially uniform speed with the molds for a limited distance and thus the mechanism utilized in ejecting the batter can be made to perform its work at a moderate rate of speed. A sectional view of one of the female molds is shown at 105 provided with a cavity 106. The batter from the outlets 60 is discharged into the cavity 106 when the male mold (not shown) is separated from the female section. The moving or oscillating of the outlets is accomplished by means of cam 62 and rollers 63 mounted on pins 64, slide 66 and connecting rod 67 having one end provided with an elongated slot or series of holes 69. A clamp stud 65 is provided with a roller 70 freely revolving and sliding within the elongated slot 72 in arm 74 which causes the arm 74 to move to and fro as acted upon by cam 62. Arm 74 is connected concentric with swivel joint 53 and is retained in position by nut 85 and washer 86. Washer 86 is retained locked against rotation by pin or other suitable means. The arm 74 is provided with means for stopping the movement of the manifold and outlets 60 when it is necessary or desired to flush the pump and the system for sanitary or other reasons.

Manifold 55 and outlets 60 are prevented from oscillating when it is desired to flush the system by withdrawing plunger 78 from engagement with arm 73. Plunger 78 may be held in the withdrawn position by flange 80 on pin 82. For disconnecting the manifold hopper 55 from pipe 90 a slip joint consisting of flange 50 and nut 49 is provided. Handle 91 is provided to revolve the manifold hopper 55 about its vertical axis after lock handle 92 has been disconnected from member 93. Handle 91 is formed integral with member 93, while handle 92 passes through bracket member 94 and is adapted to be screwed into member 93 to lock the hopper 55 and pipe 90 together.

Openings 98 and 99 are counterbored and straight, respectively, to give additional balance control to the batter by varying the size of the openings as is required in each particular system. Top portion 75 or lid of hopper 55 is provided on its underside with projections 96 the function of which is to avoid the passage of any sediment that might be carried by the batter into the openings connecting the valves 58 with cavity 89.

The third unit of the systems or the oscillating members are supported by member 83.

When the manifold is first filled air will collect at the upper portion and holes 84 are provided to permit its escape into the valve 58 and out through the tubes 60.

The entire system is connected to any suitable source of power through clutch 100. Clutch 100 is provided with two jaws 101 and 101' of different widths and engaging slots 103 and 104 of different widths in drive sprocket 102 thus permitting engagement of clutch 100 only in its proper relationship with the particular machine to which this system is attached.

In operation after the batter is received from the controlling float 13 said batter enters at the inlet of the pump base 19, the shaft 35 revolves and rotates gear 37 and cam 36 until contact of revolution is imparted to the pinion 32 and its cam 33 thence to the rotary valve 23 causing it to move until the port 24 is directly over port 25 connected to the inlet passage 18. At this point the tooth contact between pinion 32 and gear 37 has ceased and pinion 32 is held in locked position through the contact of the surface of the cam or plate 36 and edge of the cam or plate 33 attached to the pinion 32. Shaft 35 continuing to revolve causes the dwell portion of the cam 38 to pass the rollers 40 and to raise the piston 46 through the medium of the slide 39 and arm 8 and knob 43 nuts 45 and rod 42 thereby drawing batter into the cylinder 21. This operation has utilized 90 degrees of revolution of the shaft 35, considering 90 degrees at the point of locking the rotary valve 23. The dwell portion of the cam 38 causes the slide 39 to remain stationary through the next 90 degrees of revolution of the shaft 35 during which time the gear 37 and the pinion 32 have reestablished tooth contact and moves the port 24 of the rotary valve into register with outlet port 26.

At the beginning of this portion of the cycle the cutout of the cam or plate 36 unlocks the cam or plate 33 and permits the pinion to revolve about its axis until the tooth contact is again broken at which point the cams or plates 33 and 36 again locks the pinion 32. During the next 90 degrees of revolution the cam 38 again engages slide rollers 39 and imparts through the mechanism above described a downward movement to piston 46 forcing the contents of cylinder 21 out through the exhaust or discharge opening of the base 19. The batter is then delivered to the oscillating pipe at the swivel joint and then through pipe 90, manifold 55, outlets 60 to the molds of the cone baking machine.

What I claim is:

1. In a charging device comprising a chamber, a float mounted therein, a rod carried by said float and extending from said chamber, a shoulder near the top of said rod to receive adjusting weights, a pump connected to said chamber, means for operating said pump; and an oscillatable arm connected to said pump, said oscillatable member provided with a hopper and a series of outlets leading therefrom.

2. A charging apparatus comprising a series of oscillatable outlets, a hopper type manifold connected to said outlets and adapted to oscillate therewith, means for oscillating said hopper and outlets, means for drawing material into the apparatus and discharging it through said outlets comprising a pump casing, a plunger operating in said pump casing, and means for applying force to said plunger to reciprocate the same, means for regulating the travel of said plunger in said pump casing to regulate the amount of material drawn into the pump casing, and means for supplying a constant pressure of material on the inlet valve of said pump.

3. The combination with a mold having an inlet, of a charging device comprising an oscillatable hopper, said hopper provided with a series of outlets, means for oscillating said hopper and outlets, a pump for supplying material to said hopper, means for maintaining a constant pressure of material against the inlet of said pump said means comprising, a float chamber, a float mounted in said float chamber, said float carrying a rod, said rod provided with a valve at its lower end; a valve seat against which said valve is to be raised in closing the float chamber; and means for regulating the amount of material drawn into the float chamber.

4. A charging device comprising a pump, said pump having a rotary valve housing located therein, said valve housing provided with ports; a rotary valve mounted in said valve housing, said rotary valve provided with a port; means of turning said valve; means for locking said rotary valve when said port in the rotary valve is in register with inlet port of said pump; means for unlocking said rotary valve upon the drawing into of said pump of a predetermined amount of material; means for locking said rotary valve when the port in said rotary valve registers with outlet port of said pump; means for unlocking said rotary valve upon the discharge of the material; a hopper provided with a series of outlets; and means for oscillating said hopper and outlets.

5. A charging device comprising a pump casing, a rotary valve located at the bottom thereof, said rotary valve having a port therein; a housing for said rotary valve, said housing provided with ports; means of turning said rotary valve; means for locking said rotary valve when the port in the rotary valve registers with the inlet and outlet ports of said valve housing; means for connecting outlet of said pump to a swinging arm, said swinging arm provided with a hopper; a series of outlets leading from said hopper; and means for causing said arm to swing to and fro.

6. The combination with a mold having an inlet, of a charging device comprising a hopper, said hopper provided with a series of outlets; means for oscillating said hopper and outlets adjacent said molds; a pump having inlet and outlet ports for supplying material to said hopper; and means of maintaining a constant head of material against the inlet port of said pump, said means comprising, a float chamber; a float provided with a valve at its lower end; a valve seat against which said valve is to be raised in closing the float chamber; and means for regulating the amount of batter in said float chamber.

7. In a charging device comprising a pump; means of maintaining a constant head of material against the inlet of said pump, said means comprising a chamber having a float mounted therein, a rod carried by said float and extending above and below said chamber, a valve carried by the lower end of said rod, and means of permitting the escape of air from the material drawn into the chamber; means of connecting said pump to an oscillatable hopper provided with a series of outlets; and means of oscillating said hopper.

8. A charging apparatus comprising an oscillatable hopper, a series of outlets leading therefrom, a pump for drawing material into the apparatus and discharging material from the apparatus, said pump being provided with a rotary valve for controlling the material drawn into said pump and discharged therefrom, and means for maintaining a constant pressure on the inlet side of the pump valve.

9. A fluid charging apparatus comprising a pump having an inlet and an outlet, means for maintaining a constant pressure of fluid against the inlet of said pump and a receptacle having manifold discharge nozzles through which receptacle and nozzles said pump forces the fluid, and means permitting escape of air contained in the fluid from the same in passing said pressure maintaining means.

10. In a charging device for pastry baking machines a pump having a flat revolvable valve mounted therein for controlling the batter drawn into the pump and discharged therefrom, said valve adapted to be locked for a predetermined period in the intake and discharge positions.

11. The combination with a mold having an inlet of a charging device comprising a hopper, said hopper provided with a series of outlets, means for oscillating said hopper, a pump having an inlet and outlet for supplying material to said hopper; and float means associated with said pump for maintaining a constant "head" of material against the inlet of said pump.

12. A fluid charging apparatus comprising a pump having an inlet and an outlet, float means for maintaining a constant pressure of fluid against the inlet of said pump, and a receptacle having manifold discharge nozzles through which receptacle and nozzles said pump forces the fluid.

JAMES L. BALTON.